US009061322B2

(12) United States Patent
Tsuru

(10) Patent No.: US 9,061,322 B2
(45) Date of Patent: Jun. 23, 2015

(54) PRODUCT DISCRIMINATING DEVICE, PRODUCT DISCRIMINATING METHOD, AND COMPUTER PROGRAM

(75) Inventor: Teruhisa Tsuru, Kyoto-Fu (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 514 days.

(21) Appl. No.: 13/303,228

(22) Filed: Nov. 23, 2011

(65) Prior Publication Data

US 2012/0072174 A1 Mar. 22, 2012

Related U.S. Application Data

(63) Continuation of application No. PCT/JP2010/058324, filed on May 18, 2010.

(30) Foreign Application Priority Data

May 29, 2009 (JP) ................................ 2009-129932

(51) Int. Cl.
*G06F 17/18* (2006.01)
*B07C 5/00* (2006.01)

(52) U.S. Cl.
CPC ....................................... *B07C 5/00* (2013.01)

(58) Field of Classification Search
CPC .............................. G06Q 10/0635; B07C 5/00
USPC ......................................................... 702/181
See application file for complete search history.

(56) References Cited

U.S. PATENT DOCUMENTS 5,512,842 A * 4/1996 Kida ........................ 324/762.02
6,430,522 B1 8/2002 O'Brien, Jr. et al.
7,072,796 B2 * 7/2006 Kataoka ........................ 702/181
2003/0229464 A1 * 12/2003 Takanabe ........................ 702/84
2004/0093115 A1 * 5/2004 Usui et al. ...................... 700/204
2006/0210141 A1 * 9/2006 Kojitani et al. ............... 382/141

(Continued)

FOREIGN PATENT DOCUMENTS

CN 101421679 A 4/2009
JP 63-305974 A 12/1988
JP 2005-107896 A 4/2005
JP 2007-040864 A 2/2007

OTHER PUBLICATIONS

Deaver, "Managing Calibration Confidence in the Real World" 1995 NCSL Workshop and Symposium.

(Continued)

*Primary Examiner* — John Breene
*Assistant Examiner* — Stephanie Bloss
(74) *Attorney, Agent, or Firm* — Arent Fox LLP

(57) ABSTRACT

A product discriminating device that includes a measuring section, a discriminating unit, a deemed standard deviation calculation unit, a re-discriminating unit, a rank estimated number calculation unit, and a standard deviation calculation unit. The standard deviation calculation unit changes variables of a probability distribution of a deemed standard deviation such that the number of products belonging to at least one of a predetermined plurality of ranks re-discriminated at least once and an estimated number of the products belonging to the rank in a rank estimated number calculation unit substantially match each other, and calculates the changed variables as a standard deviation of characteristic value variation of the products and a standard deviation of measurement value variation.

12 Claims, 10 Drawing Sheets

(56) References Cited

U.S. PATENT DOCUMENTS

| | | | | |
|---|---|---|---|---|
| 2006/0235560 | A1* | 10/2006 | Ogawa et al. | 700/109 |
| 2006/0265185 | A1* | 11/2006 | Lanzerotti et al. | 702/181 |
| 2007/0105238 | A1 | 5/2007 | Mandl et al. | |
| 2009/0177439 | A1 | 7/2009 | Samples et al. | |
| 2010/0010941 | A1* | 1/2010 | Keck | 706/12 |
| 2010/0100221 | A1 | 4/2010 | Yadav et al. | |
| 2012/0095803 | A1* | 4/2012 | Tsuru | 705/7.28 |

OTHER PUBLICATIONS

Dobbert, "Understanding Measurement Risk" 2007 NCSL International Workshop and Symposium.

PCT/JP2010/058324 Written Opinion dated Aug. 31, 2010.

* cited by examiner

PRODUCT DISCRIMINATING DEVICE, PRODUCT DISCRIMINATING METHOD, AND COMPUTER PROGRAM

CROSS REFERENCE TO RELATED APPLICATIONS

The present application is a continuation of International application No. PCT/JP2010/058324, filed May 18, 2010, which claims priority to Japanese Patent Application No. 2009-129932, filed May 29, 2009, the entire contents of each of which are incorporated herein by reference.

FIELD OF THE INVENTION

The present invention relates to a product discriminating device, a product discriminating method, and a computer program for discriminating products.

BACKGROUND OF THE INVENTION

A product has a characteristic value, which indicates a predetermined characteristic and is measured before shipment, and is discriminated as a non-defective article or a defective article depending on whether or not a predetermined standard is satisfied. The product is discriminated by comparing the characteristic value of the product measured using a product discriminating device and an inspection standard, of which condition is stricter than a product standard (characteristic value required for the product). If the variation in the measured characteristic values of the products is only the variation in the characteristic values of the products themselves, whether the product is a non-defective article or a defective article can be correctly discriminated by the product discriminating device even if the inspection standard is defined in the same condition as the product standard.

However, the variation in the measured characteristic values of the products includes not only the variation in the characteristic values of the products themselves, but also the variation in the measurement values of the measurement system. Thus, the products discriminated as non-defective articles by the product discriminating device may include a defective article, or the products discriminated as defective articles may include a non-defective article. A probability a product, which is a defective article, is mistakenly determined as a non-defective article is called a consumer risk, and a probability a product, which is a non-defective article, is mistakenly determined as a defective article is called a producer risk.

A method of calculating the consumer risk and the producer risk is disclosed in Non-Patent Documents 1 and 2. Non-Patent Document 1 discloses a method of calculating the consumer risk and the producer risk by a product discriminating device using the Monte Carlo method. Non-Patent Document 2 discloses a method of calculating the consumer risk and the producer risk assuming that the variation in the characteristic values and the variation in the measurement values have normal distributions using a double integral equation.

Non-Patent Document 1: M. Dobbert, “Understanding Measurement Risk”, NCSL International Workshop and Symposium, August 2007.

Non-Patent Document 2: David Deaver, “Managing Calibration Confidence in the Real World”, NCSL International Workshop and Symposium, 1995.

SUMMARY OF THE INVENTION

The consumer risk and the producer risk can be calculated using the method disclosed in Non-Patent Document 1 or 2.

However, the variation in the characteristic values of the products themselves, the variation in the measurement values of the measurement system, and the like cannot be calculated even by using the method disclosed in Non-Patent Document 1 or 2.

A method of evaluating uncertainty, a method of the measurement system analysis (MSA) defined in particular requirements (ISO/TS 16949) for automotive production and relevant service part organizations of quality management system standards (ISO 9001:2000), and the like are conventionally used to calculate the variation in the measurement values of the measurement system.

However, the method of evaluating uncertainty divides the measurement system into elements in which uncertainty occurs such as a measurement jig, and a sensor, and evaluates the uncertainty for each of the elements to calculate the standard deviation of the variation in the measurement values, which indicates the uncertainty of the entire measurement system. Thus, the method of evaluating uncertainty requires specialized experiences for each of the elements and also requires a long time for the task, and hence is difficult to apply to a product discriminating device that is arranged in a manufacturing line.

In the method of the measurement system analysis (MSA), the standard deviation of the variation in the measurement values is calculated using the Gage Repeatability and Reproducibility (GR & R) method, and thus repeated measurements involving tasks such as detachment of the measurement jig, remeasurements of the characteristic values of all products, and the like need to be carried out, which increases the labor cost. For instance, the task such as detachment of the measurement jig is particularly troublesome in a product discriminating device that discriminates ten thousand capacitors, in which a condenser capacity is a characteristic value, in one minute, and the task of about two hours is required to calculate the standard deviation of the variation in the measurement values, and thus the labor cost increases.

In view of the foregoing circumstances, it is an object of the present invention to provide a product discriminating device, a product discriminating method, and a computer program capable of calculating a standard deviation of the characteristic value variation of the products and a standard deviation of the measurement value variation through a short time task without carrying out a troublesome task such as detachment of the measurement jig.

To achieve the above object, a product discriminating device according to a first invention includes: a measuring section for measuring characteristic values indicating predetermined characteristics of products; a discriminating unit for discriminating the products into a predetermined plurality of ranks based on the measured characteristic values; a deemed standard deviation calculation unit for calculating a standard deviation of variation in the measured characteristic values as a deemed standard deviation; a re-discriminating unit for re-measuring characteristic values of the products belonging to at least one of the discriminated predetermined plurality of ranks and re-discriminating the products into the predetermined plurality of ranks based on the re-measured characteristic values; a rank estimated number calculation unit for estimating the number of the products belonging to each of the ranks when re-discriminated at least once based on a probability distribution of the deemed standard deviation having a standard deviation of the characteristic value variation of the products and a standard deviation of the measurement value variation as variables, and calculating as an estimated number of the products belonging to each of the ranks; and a standard deviation calculation unit for changing the variables of the probability distribution of the deemed standard deviation such that the number of the products belonging to at least one of the plurality of ranks re-discriminated at least once and the estimated number of the products belonging to the rank substantially match each other, and calculating the changed variables as the standard deviation of the characteristic value variation of the products and the standard deviation of the measurement value variation.

According to the product discriminating device of a second invention, in the first invention, the predetermined plurality of ranks are provided, as a reference, with a predetermined inspection standard which defines an upper limit value and a lower limit value of the characteristic values for determining whether or not each of the products is a non-defective article; the re-discriminating unit re-discriminates the products belonging to a rank in which the characteristic values are smaller than or equal to the upper limit value and greater than or equal to the lower limit value of the predetermined inspection standard; and the standard deviation calculation unit calculates the variables of the probability distribution, in which the number of the re-discriminated products belonging to a rank greater than the upper limit value of the predetermined inspection standard and a rank smaller than the lower limit value of the predetermined inspection standard, and the estimated number of the products belonging to the ranks substantially match each other, as the standard deviation of the characteristic value variation of the products and the standard deviation of the measurement value variation.

According to the product discriminating device of a third invention, in the first invention, the predetermined plurality of ranks are provided, as a reference, with a predetermined inspection standard which defines an upper limit value and a lower limit value of the characteristic values for determining whether or not each of the products is a non-defective article; the re-discriminating unit re-discriminates the products belonging to a rank in which the characteristic values are greater than the upper limit value of the predetermined inspection standard and a rank in which the characteristic values are smaller than the lower limit value of the predetermined inspection standard; and the standard deviation calculation unit calculates the variables of the probability distribution, in which the number of the re-discriminated products belonging to the rank greater than the upper limit value of the predetermined inspection standard and the rank smaller than the lower limit value of the predetermined inspection standard, and the estimated number of the products belonging to the ranks substantially match each other, as the standard deviation of the characteristic value variation of the products and the standard deviation of the measurement value variation.

According to the product discriminating device of a fourth invention, in any one of the first to third inventions, the rank estimated number calculation unit divides the probability distribution of the standard deviation of the characteristic value variation of the products into a plurality of zones, estimates the number of the products belonging to each of the ranks assuming that the probability distribution in each of the zones follows the probability distribution of the standard deviation of the measurement value variation, and calculates as the estimated number of the products belonging to each of the ranks.

To achieve the above object, a product discriminating method according to a fifth invention includes the steps of: measuring characteristic values indicating predetermined characteristics of products; discriminating the products into a predetermined plurality of ranks based on the measured characteristic values; calculating a standard deviation of variation in the measured characteristic values as a deemed standard deviation; re-measuring characteristic values of the products belonging to at least one of the discriminated predetermined plurality of ranks and re-discriminating the products into the predetermined plurality of ranks based on the re-measured characteristic values; estimating the number of the products belonging to each of the ranks when re-discriminated at least once based on a probability distribution of the deemed standard deviation having a standard deviation of characteristic value variation of the products and a standard deviation of measurement value variation as variables, and calculating as an estimated number of the products belonging to each of the ranks; and changing the variables of the probability distribution of the deemed standard deviation such that the number of the products belonging to at least one of the plurality of ranks re-discriminated at least once and the estimated number of the products belonging to the rank substantially match each other, and calculating the changed variables as the standard deviation of the characteristic value variation of the products and the standard deviation of the measurement value variation.

According to the product discriminating method of a sixth invention, in the fifth invention, the predetermined plurality of ranks are provided, as a reference, with a predetermined inspection standard which defines an upper limit value and a lower limit value of the characteristic values for determining whether or not each of the products is a non-defective article; the products belonging to a rank in which the characteristic values are smaller than or equal to the upper limit value and greater than or equal to the lower limit value of the predetermined inspection standard are re-discriminated; and the variables of the probability distribution, in which the number of the re-discriminated products belonging to a rank greater than the upper limit value of the predetermined inspection standard and a rank smaller than the lower limit value of the predetermined inspection standard, and the estimated number of the products belonging to the ranks substantially match each other, are calculated as the standard deviation of the characteristic value variation of the products and the standard deviation of the measurement value variation.

According to the product discriminating method of a seventh invention, in the fifth invention, the predetermined plurality of ranks are provided, as a reference, with a predetermined inspection standard which defines an upper limit value and a lower limit value of the characteristic values for determining whether or not each of the products is a non-defective article; the products belonging to a rank in which the characteristic values are greater than the upper limit value of the predetermined inspection standard and a rank in which the characteristic values are smaller than the lower limit value of the predetermined inspection standard are re-discriminated; and the variables of the probability distribution, in which the number of the re-discriminated products belonging to the rank greater than the upper limit value of the predetermined inspection standard and the rank smaller than the lower limit value of the predetermined inspection standard, and the estimated number of the products belonging to the ranks substantially match each other, are calculated as the standard deviation of the characteristic value variation of the products and the standard deviation of the measurement value variation.

According to the product discriminating method of an eighth invention, in any one of the fifth to seventh inventions, the probability distribution of the standard deviation of the characteristic value variation of the products is divided into a plurality of zones, the number of the products belonging to each of the ranks is estimated assuming that the probability distribution in each of the zones follows the probability distribution of the standard deviation of the measurement value variation, and is calculated as the estimated number of the products belonging to each of the ranks.

To achieve the above object, a computer program according to a ninth invention relates to a computer program executable in a product discriminating device for discriminating products; the computer program causing the product discriminating device to function as a measuring means for measuring characteristic values indicating predetermined characteristics of products; a discriminating means for discriminating the products into a predetermined plurality of ranks based on the measured characteristic values; a deemed standard deviation calculation means for calculating a standard deviation of variation in the measured characteristic values as a deemed standard deviation; a re-discriminating means for re-measuring characteristic values of the products belonging to at least one of the discriminated predetermined plurality of ranks and re-discriminating the products into the predetermined plurality of ranks based on the re-measured characteristic values; a rank estimated number calculation means for estimating the number of the products belonging to each of the ranks when re-discriminated at least once based on a probability distribution of the deemed standard deviation having a standard deviation of characteristic value variation of the products and a standard deviation of measurement value variation as variables, and calculating as an estimated number of the products belonging to each of the ranks; and a standard deviation calculation means for changing the variables of the probability distribution of the deemed standard deviation such that the number of the products belonging to at least one of the plurality of ranks re-discriminated at least once and the estimated number of the products belonging to the rank substantially match each other, and calculating the changed variables as the standard deviation of the characteristic value variation of the products and the standard deviation of the measurement value variation.

According to the computer program of a tenth invention, in the ninth invention, the predetermined plurality of ranks are provided, as a reference, with a predetermined inspection standard which defines an upper limit value and a lower limit value of the characteristic values for determining whether or not each of the products is a non-defective article; and the computer program causes the re-discriminating means to function as a means for re-discriminating the products belonging to a rank in which the characteristic values are smaller than or equal to the upper limit value and greater than or equal to the lower limit value of the predetermined inspection standard, and the standard deviation calculation means to function as a means for calculating the variables of the probability distribution, in which the number of the re-discriminated products belonging to a rank greater than the upper limit value of the predetermined inspection standard and a rank smaller than the lower limit value of the predetermined inspection standard, and the estimated number of the products belonging to the ranks substantially match each other, as the standard deviation of the characteristic value variation of the products and the standard deviation of the measurement value variation.

According to the computer program of an eleventh invention, in the ninth invention, the predetermined plurality of ranks are provided, as a reference, with a predetermined inspection standard which defines an upper limit value and a lower limit value of the characteristic values for determining whether or not each of the products is a non-defective article; and the computer program causes the re-discriminating means to function as a means for re-discriminating the products belonging to a rank in which the characteristic values are greater than the upper limit value of the predetermined inspection standard and a rank in which the characteristic values are smaller than the lower limit value of the predetermined inspection standard, and the standard deviation calculation means to function as a means for calculating the variables of the probability distribution, in which the number of the re-discriminated products belonging to the rank greater than the upper limit value of the predetermined inspection standard and the rank smaller than the lower limit value of the predetermined inspection standard, and the estimated number of the products belonging to the ranks substantially match each other, as the standard deviation of the characteristic value variation of the products and the standard deviation of the measurement value variation.

According to the computer program of a twelfth invention, in any one of the ninth to eleventh inventions, the computer program causes the rank estimated number calculation means to function as a means for dividing the probability distribution of the standard deviation of the characteristic value variation of the products into a plurality of zones, estimating the number of the products belonging to each of the ranks assuming that the probability distribution in each of the zones follows the probability distribution of the standard deviation of the measurement value variation, and calculating as the estimated number of the products belonging to each of the ranks.

In the first, fifth, and ninth inventions, the characteristic values of the products belonging to at least one of the discriminated predetermined plurality of ranks are re-measured and the products are re-discriminated into the predetermined plurality of ranks based on the re-measured characteristic values, so that the characteristic values of all the products do not need to be re-measured, and the repeated measurement involving tasks such as detachment of a measurement jig does not need to be carried out as in the method of the measurement system analysis (MSA). Therefore, the time for calculating the standard deviation of the measurement value variation can be greatly reduced. The number of the products belonging to each rank is estimated based on the probability distribution of the deemed standard deviation having the standard deviation of the characteristic value variation of the products and the standard deviation of the measurement value variation as the variables, and is calculated as the estimated number of the products belonging to each rank, the variables of the probability distribution of the deemed standard deviation are changed such that the number of the products belonging to at least one rank and the estimated number of the products belonging to the rank substantially match each other, and the changed variables are calculated as the standard deviation of the characteristic value variation of the products and the standard deviation of the measurement value variation, so that the standard deviation of the characteristic value variation of the products and the standard deviation of the measurement value variation can be calculated without solving a simultaneous equation that is mathematically difficult to solve.

In the second, sixth, and tenth inventions, the products belonging to the rank in which the characteristic values are smaller than or equal to the upper limit value and greater than or equal to the lower limit value of the predetermined inspection standard are re-discriminated, and hence the possibility of mistakenly discriminating and shipping a defective article as a non-defective article can be reduced by again inspecting the products belonging to the rank discriminated as non-defective articles.

In the third, seventh, and eleventh inventions, the products belonging to the rank in which the characteristic values are greater than the upper limit value of the predetermined inspection standard and the rank in which the characteristic values are smaller than the lower limit value of the predetermined inspection standard, are re-discriminated, and hence the possibility of mistakenly discriminating a non-defective article as a defective article can be reduced and the rate of the non-defective articles can be improved by again inspecting the products belonging to the ranks discriminated as defective articles.

In the fourth, eighth, and twelfth inventions, the probability distribution of the standard deviation of the characteristic value variation of the products is divided into the plurality of zones, and the number of the products belonging to each rank is estimated assuming that each zone follows the probability distribution of the standard deviation of the measurement value variation to calculate as the estimated number of the products belonging to each rank, and thus the number of the products belonging to each rank can be estimated without solving a simultaneous equation that is mathematically difficult to solve.

In the product discriminating device, the product discriminating method, and the computer program configured as described above according to the present invention, the standard deviation of the characteristic value variation of the products and the standard deviation of the measurement value variation can be calculated in a short period of time without performing the troublesome task such as detachment of a measurement jig.

DETAILED DESCRIPTION OF THE INVENTION

Hereinafter, a product discriminating device capable of calculating a standard deviation of variation in characteristic values of products themselves and a standard deviation of variation in measurement values of a measurement system according to embodiments of the present invention will be specifically described with reference to drawings. The invention defined in Claims is not limited by the following embodiments, and it should be recognized that not all combinations of the characteristic matters described in the embodiments are essential to solve the problems.

In the following embodiments, a product discriminating device in which a computer program is introduced into a computer system will be described, but it should be apparent to those skilled in the art that the present invention can have one part implemented as a computer executable computer program. Therefore, the present invention may include an embodiment as hardware of the product discriminating device, an embodiment as software, or an embodiment of a combination of software and hardware. The computer program can be recorded on an arbitrary computer readable recording medium such as a hard disc, a DVD, a CD, an optical storage device, or a magnetic storage device.

(First Embodiment)

Figure 1:
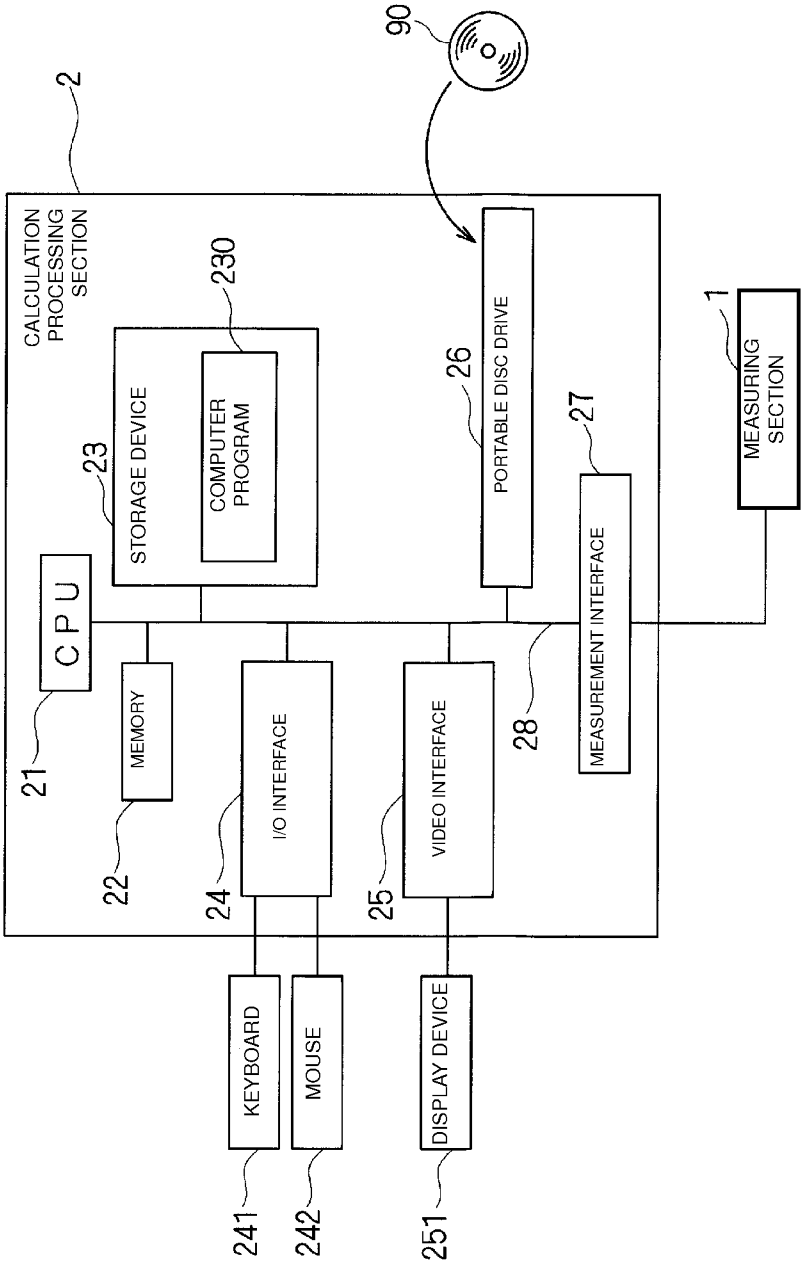
FIG. 1 is a block diagram showing a configuration example of a product discriminating device according to a first embodiment of the present invention.

FIG. 1 is a block diagram showing a configuration example of a product discriminating device according to a first embodiment of the present invention. The product discriminating device according to the first embodiment includes a measuring section 1 for measuring a characteristic value indicating a predetermined characteristic of a product, and a calculation processing section 2 for calculating the measured characteristic value.

The measuring section 1 measures the characteristic value indicating the predetermined characteristic of the product. For instance, if the product is a ceramic capacitor, the measuring section 1 measures a condenser capacity, which is the characteristic value of the product. The hardware configuration of the measuring section 1 for measuring the condenser capacity includes an LCR meter.

The calculation processing section 2 is configured at least by a CPU (Central Processing Unit) 21, a memory 22, a storage device 23, an I/O interface 24, a video interface 25, a portable disc drive 26, a measurement interface 27, and an internal bus 28 for connecting the above hardware.

The CPU 21 is connected to each hardware described above in the calculation processing section 2 through the internal bus 28 to control the operation of each hardware described above and execute various software functions according to a computer program 230 stored in the storage device 23. The memory 22 is configured by a volatile memory such as a SRAM or a SDRAM, where a load module is developed at the time of execution of the computer program 230 and temporary data and the like generated at the time of the execution of the computer program 230 is stored.

The storage device 23 is configured by a built-in fixed storage device (hard disc), a ROM, or the like. The computer program 230 stored in the storage device 23 is downloaded from a portable recording medium 90 such as a DVD or a CD-ROM, on which information such as the program and data is recorded, by the portable disc drive 26, and is developed from the storage device 23 to the memory 22 and then executed at the time of the execution. It may, of course, be a computer program downloaded from an external computer connected to a network.

The measurement interface 27 is connected to the internal bus 28 and to the measuring section 1, so that the measured characteristic value, the control signal, and the like can be transmitted and received between the measuring section 1 and the calculation processing section 2.

The I/O interface 24 is connected to a data input medium such as a keyboard 241 or a mouse 242 to receive the input of data. The video interface 25 is connected to a display device 251 such as a CRT monitor or an LCD to display a predetermined image.

Figure 2:
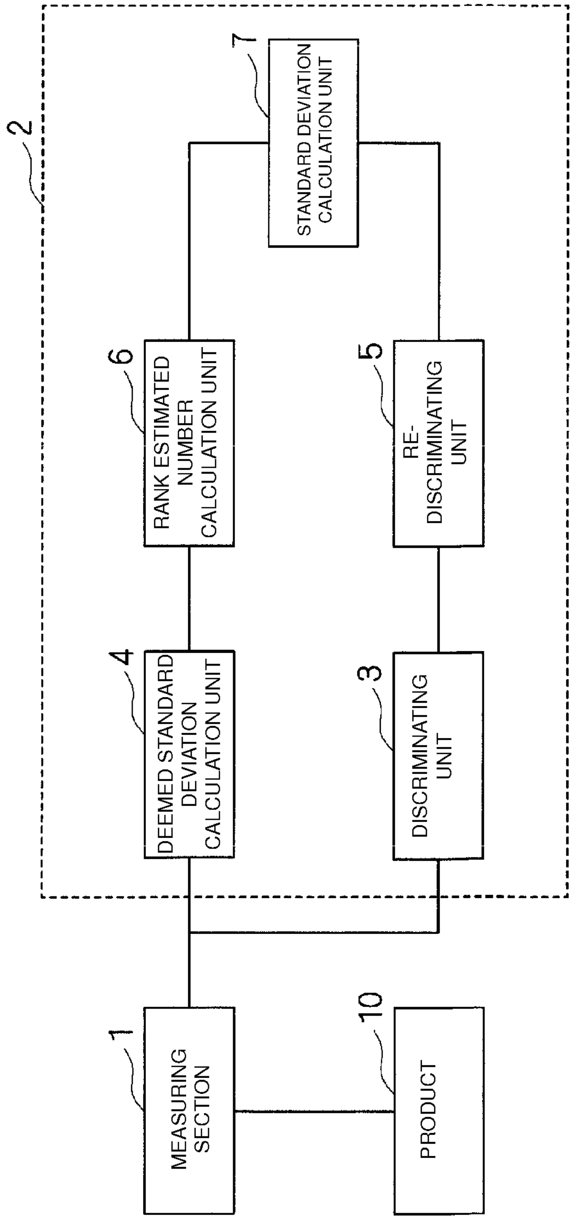
FIG. 2 is a functional block diagram of the product discriminating device according to the first embodiment of the present invention.

The operation of the product discriminating device configured as above will be described below. FIG. 2 is a functional block diagram of the product discriminating device according to the first embodiment of the present invention. The measuring section 1 measures a characteristic value indicating a predetermined characteristic of a product 10.

Figure 3:
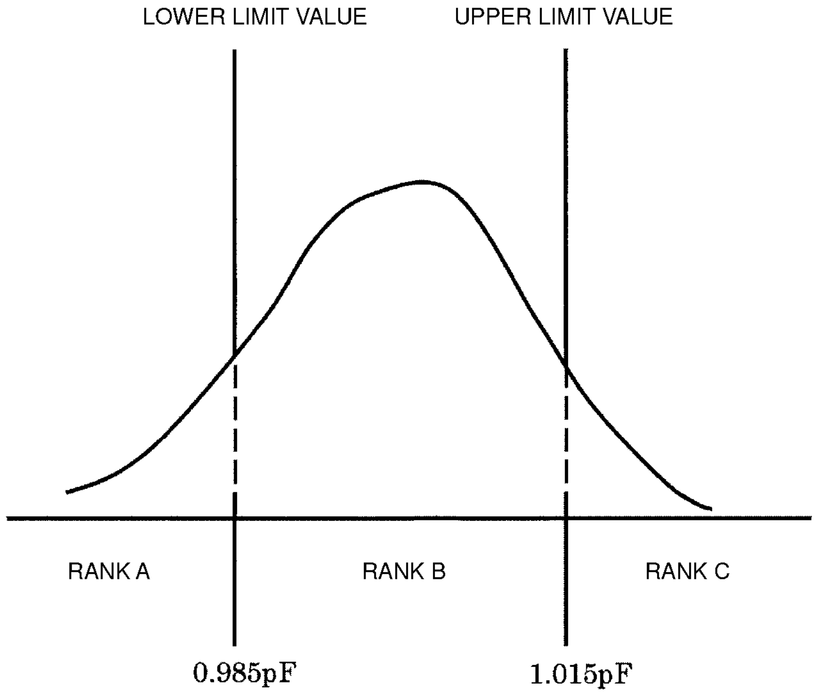
FIG. 3 is a schematic view of a probability distribution in a case where a discriminating unit of the product discriminating device according to the first embodiment of the present invention discriminates products into a plurality of ranks.

A discriminating unit 3 discriminates the products 10 into a plurality of ranks based on the characteristic values measured in the measuring section 1. The ranks for discriminating the products 10 are provided, as a reference, with a predetermined inspection standard defining an upper limit value and a lower limit value of the characteristic values for determining whether or not the products 10 are non-defective articles. In the first embodiment, a case in which the inspection standard is defined in the same condition as the product standard will be described. FIG. 3 is a schematic view of a probability distribution in a case where the discriminating unit 3 of the product discriminating device according to the first embodiment of the present invention discriminates the products 10 into a plurality of ranks. FIG. 3 shows the probability distribution of the measured characteristic values of the products 10 with the horizontal axis indicating the characteristic values of the products 10 and the vertical axis indicating the number of the products 10. The probability distribution of the measured characteristic values of the products 10 is a normal distribution.

Furthermore, FIG. 3 shows the upper limit value and the lower limit value of the characteristic values defined by the predetermined inspection standard. The discriminating unit 3 discriminates the products 10 with a range smaller than the lower limit value of the characteristic values as a rank A, a range greater than or equal to the lower limit value and smaller than or equal to the upper limit value of the characteristic values as a rank B, and a range greater than the upper limit value of the characteristic values as a rank C. The product 10 belonging to the rank B is determined as a non-defective article based on the inspection standard, and the product 10 belonging to the rank A or C is determined as a defective article based on the inspection standard.

Returning to FIG. 2, a deemed standard deviation calculation unit 4 calculates the standard deviation of the variation in the measured characteristic values as a deemed standard deviation. The deemed standard deviation calculation unit 4 can calculate the deemed standard deviation, and can also calculate an average value of the measured characteristic values of the products 10. The deemed standard deviation and the average value can be calculated based on the measured characteristic value. However, in the deemed standard deviation calculation unit 4 according to the first embodiment, the deemed standard deviation and the average value are not calculated from the measured characteristic values, but the deemed standard deviation and the average value are calculated from an inverse function of a cumulative distribution function of the normal distribution using the number of the products 10 belonging to at least one rank (e.g., the rank B) out of a plurality of ranks discriminated by the discriminating unit 3. That is, assuming that the probability distribution of the measured characteristic values of the products 10 is a normal distribution, the probability distribution can be specified by obtaining the number of the products 10 belonging to the rank A, and the deemed standard deviation and the average value can be obtained.

A re-discriminating unit 5 re-measures in the measuring section 1 the characteristic values of the products 10 belonging to the rank B discriminated by the discriminating unit 3, and re-discriminates the products 10 into a plurality of ranks provided with the inspection standard same as the discriminating unit 3 as a reference based on the re-measured characteristic values. If the measuring section 1 does not have variation in the measurement values (measurement value variation) and the re-discriminating unit 5 re-measures the characteristic values of the products 10 belonging to the rank B and re-discriminates the products into a plurality of ranks based on the re-measured characteristic values, all the re-discriminated products 10 always belong to the rank B. If there is measurement value variation and the re-discriminating unit 5 re-measures the characteristic values of the products 10 belonging to the rank B and re-discriminates the products into a plurality of ranks based on the re-measured characteristic values, the re-discriminated products 10 may belong to the rank A or C other than the rank B. The products 10 may belong to the rank A or C by re-discrimination when the product 10, which originally belongs to the rank A or C, is mistakenly re-discriminated as the product 10 belonging to the rank B in the re-discrimination by the measurement value variation, or when the product 10, which originally belongs to the rank B, is mistakenly re-discriminated as the product 10 belonging to the rank A or C in the re-discrimination by the measurement value variation. The measurement value variation always exists in the actual measuring section 1, and hence the re-discriminated product 10 may belong to the rank A or C other than the rank B.

Figure 4:
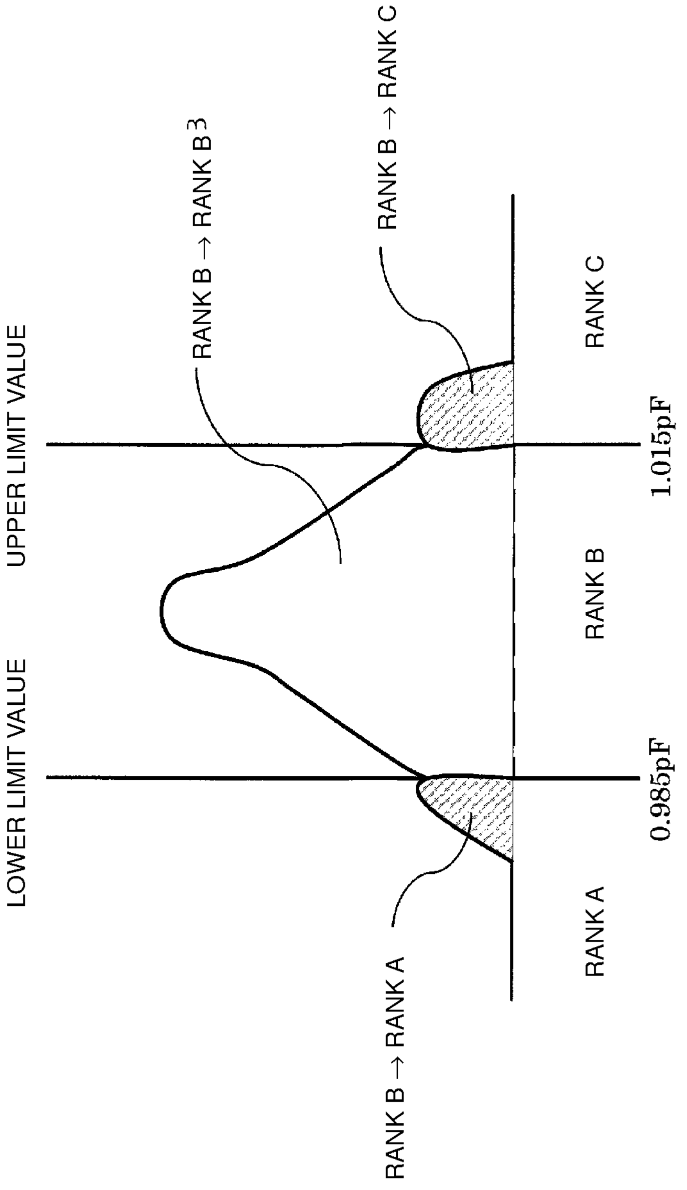
FIG. 4 is a schematic view of a probability distribution in a case where a re-discriminating unit of the product discriminating device according to the first embodiment of the present invention re-discriminates products belonging to a rank B into a plurality of ranks.

A specific example in which the re-discriminating unit 5 re-discriminates the products 10 belonging to the rank B into a plurality of ranks will be described with reference to a drawing. FIG. 4 is a schematic view of a probability distribution in a case where the re-discriminating unit 5 of the product discriminating device according to the first embodiment of the present invention re-discriminates the products 10 belonging to the rank B into a plurality of ranks. Similarly to FIG. 3, FIG. 4 also shows the upper limit value and the lower limit value of the characteristic values defined by the inspection standard. FIG. 4 shows a state in which the products 10 belonging to the rank B in the discrimination are re-discriminated to the rank A or C by the measurement value variation of the measuring section 1. Specifically, the product 10 belonging to the rank A in FIG. 4 is a product re-discriminated from the rank B to the rank A. The product 10 belonging to the rank C in FIG. 4 is a product re-discriminated from the rank B to the rank C. The product 10 belonging to the rank B in FIG. 4 is a product re-discriminated from the rank B to the rank B.

For instance, if the re-discriminated products 10 are capacitors each having a condenser capacity of 1 pF, and 3525 products 10 are measured in the measuring section 1, the average value of the characteristic values is calculated as 1.0067 pF from the measurement results, and the deemed standard deviation is calculated as 0.02125 pF in the deemed standard deviation calculation unit 4. If the lower limit value of the inspection standard is 0.985 pF and the upper limit value is 1.015 pF, the discriminating unit 3 discriminates the 3525 products 10 into 543 products in the rank A, 1758 products in the rank B, and 1224 products in the rank C.

The re-discriminating unit 5 re-measures in the measuring section 1 the characteristic values of the 1758 products 10 belonging to the rank B, and re-discriminates the products into a plurality of ranks based on the re-measured characteristic values. As a result of the re-discrimination in the re-discriminating unit 5, the products 10 are re-discriminated into 77 for rank A, 1559 for rank B, and 122 for rank C. In this case, the conditions of the re-discriminated 199 (77+122) products 10 belonging to the rank A or C are the following two types of conditions, first and second conditions. The first condition is that the product 10 is truly in the rank B (the true characteristic value is within a range smaller than or equal to the upper limit value and greater than or equal to the lower limit value of the inspection standard), the product 10 being discriminated into the rank B in the discriminating unit 3 and being re-discriminated into the rank A or C in the re-discriminating unit 5. The second condition is that the product 10 is truly in the rank A or C (the true characteristic value is within a range greater than the upper limit value or smaller than the lower limit value of the inspection standard), the product 10 being discriminated into the rank B in the discriminating unit 3 and being re-discriminated into the rank A or C in the re-discriminating unit 5.

The product 10 re-discriminated into the rank A or C in the re-discriminating unit 5 exists because not only the variation in the characteristic values (characteristic value variation) of the products themselves but also the measurement value variation exists, as described earlier. A deemed standard deviation TV calculated in the deemed standard deviation calculation unit 4, for calculating the standard deviation of the variation in the characteristic values measured in the measuring section 1 as the deemed standard deviation, can be expressed as (equation 1) with the standard deviation PV of the characteristic value variation and the standard deviation GRR of the measurement value variation.

$$TV^2=PV^2+GRR^2 \quad \text{[Equation 1]}$$

As apparent from (equation 1), the deemed standard deviation TV calculated in the deemed standard deviation calculation unit 4 is equal to the standard deviation PV of the characteristic value variation if the standard deviation GRR of the measurement value variation is 0 (zero).

If the standard deviation GRR of the measurement value variation is not 0 (zero), the standard deviation PV of the characteristic value variation and the standard deviation GRR of the measurement value variation cannot be calculated by simply calculating the deemed standard deviation TV in the deemed standard deviation calculation unit 4. In order to calculate the standard deviation PV of the characteristic value variation and the standard deviation GRR of the measurement value variation, both (equation 1) and the number of the products 10 that satisfies the first and second conditions described above need to be satisfied.

The number of the products 10 that satisfies the first and second conditions can be obtained by solving a consumer risk CR (equation 2) of the probability of discriminating a true defective article as a non-defective article by the measurement and a producer risk PR (equation 3) of the probability of discriminating a true non-defective article as a defective article by the measurement as disclosed in Non-Patent Document 2.

$$Cr=\frac{1}{2\pi}\cdot\int_{-\infty}^{-L}\int_{-R(t+k\cdot L)}^{-R(t-k\cdot L)}e^{-\frac{(t-u)^2+(s-v)^2}{2}}\,ds\,dt+\frac{1}{2\pi}\cdot\int_{L}^{\infty}\int_{-R(t+k\cdot L)}^{-R(t-k\cdot L)}e^{-\frac{(t-u)^2+(s-v)^2}{2}}\,ds\,dt \quad \text{[Equation 2]}$$

$$PR=\frac{1}{2\pi}\cdot\int_{-L}^{L}\int_{-\infty}^{-R(t+k\cdot L)}e^{-\frac{(t-u)^2+(s-v)^2}{2}}\,ds\,dt+\frac{1}{2\pi}\cdot\int_{-L}^{L}\int_{-R(t-k\cdot L)}^{\infty}e^{-\frac{(t-u)^2+(s-v)^2}{2}}\,ds\,dt \quad \text{[Equation 3]}$$

If the probability distribution of the characteristic value variation of the products 10 and the probability distribution of the measurement value variation in the measuring section 1 are normal distributions, (equation 2) and (equation 3) are expressed in the form of double integral of a probability density function of the characteristic value variation of the products 10 in which the reference normal distribution is obtained by the standard deviation PV of the characteristic value variation of the products 10 and a probability density function of the measurement value variation in which the reference normal distribution is obtained by the standard deviation GRR of the measurement value variation in the measuring section 1. Here, t is a position from the center of the probability distribution of the characteristic value variation of the products 10, s is a position from the center of the probability distribution of the measurement value variation in the measuring section 1, L is a half bandwidth of the product standard (when the center of the product standard of the products 10 is zero, the distance from zero to the upper limit value or the lower limit value of the product standard of the products 10), k·L is a half bandwidth of the inspection standard (when the center of the inspection standard of the products 10 is zero, the distance from zero to the upper limit value or the lower limit value of the inspection standard of the products 10), u is a bias of the probability distribution of the characteristic value variation of the products 10, v is a bias of the probability distribution of the measurement value variation in the measuring section 1, and R is an accuracy ratio (a value obtained by dividing the standard deviation PV of the characteristic value variation of the products 10 by the standard deviation GRR of the measurement value variation in the measuring section 1). In the product discriminating device according to the first embodiment, the product standard and the inspection standard are in the same conditions, and hence k=1 is satisfied.

The simultaneous equation of the double integral equation of (equation 2) and (equation 3) that satisfy the first condition and the second condition, and (equation 1) needs to be solved in order to calculate the standard deviation PV of the characteristic value variation and the standard deviation GRR of the measurement value variation using (equation 2) and (equation 3). However, it is difficult to mathematically solve such simultaneous equation.

Thus, in the product discriminating device according to the first embodiment, the standard variation PV of the characteristic value variation and the standard deviation GRR of the measurement value variation of the products 10 that satisfy both (equation 1) and the number of the products 10 satisfying the first condition and the second condition are to be calculated using a rank estimated number calculation unit 6 and a standard deviation calculation unit 7 shown in FIG. 2. The rank estimated number calculation unit 6 estimates the number of the products 10 belonging to each of the ranks A, B, and C after the re-discrimination based on the probability distribution of the deemed standard deviation TV having the standard deviation PV of the characteristic value variation and the standard deviation GRR of the measurement value variation as variables, and calculates the same as the estimated number of the products 10 belonging to each of the ranks. The standard deviation calculation unit 7 changes the variables of the probability distribution of the deemed standard deviation TV such that the number of the products 10 belonging to the rank A or C re-discriminated in the re-discriminating unit 5 and the estimated number of the products 10 belonging to the rank A or C substantially match each other, and calculates the changed variables as the standard deviation PV of the characteristic value variation of the products 10 and the standard deviation GRR of the measurement value variation.

Figure 5:
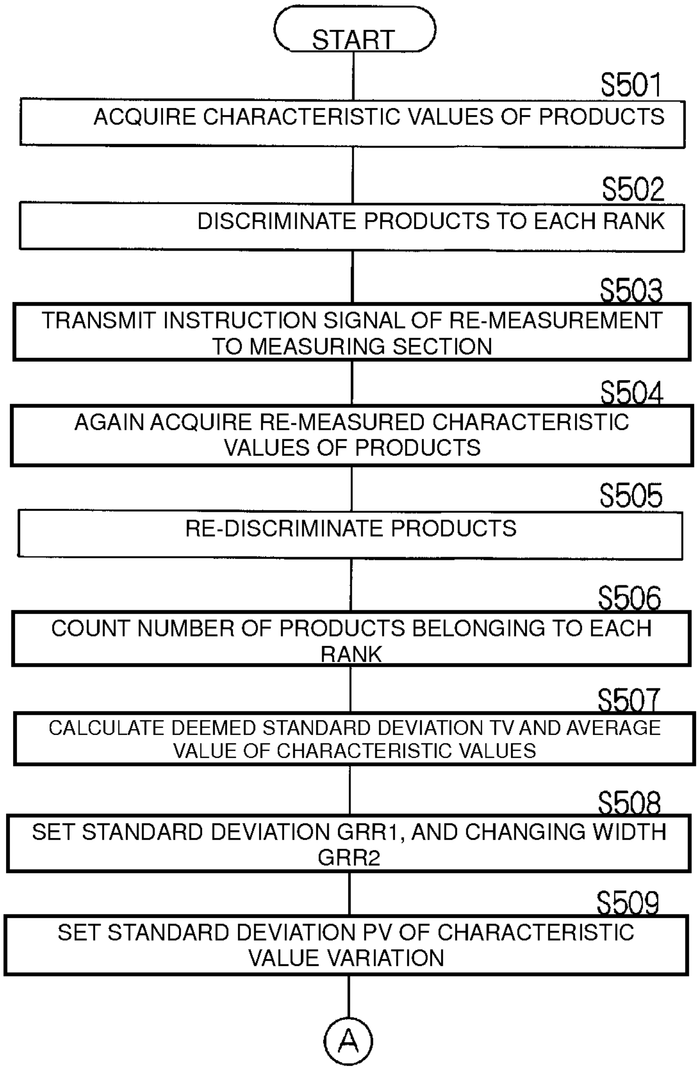
FIG. 5 is a flowchart showing a processing procedure in which the product discriminating device according to the first embodiment of the present invention calculates a standard deviation PV of characteristic value variation and a standard deviation GRR of measurement value variation.
Figure 6:
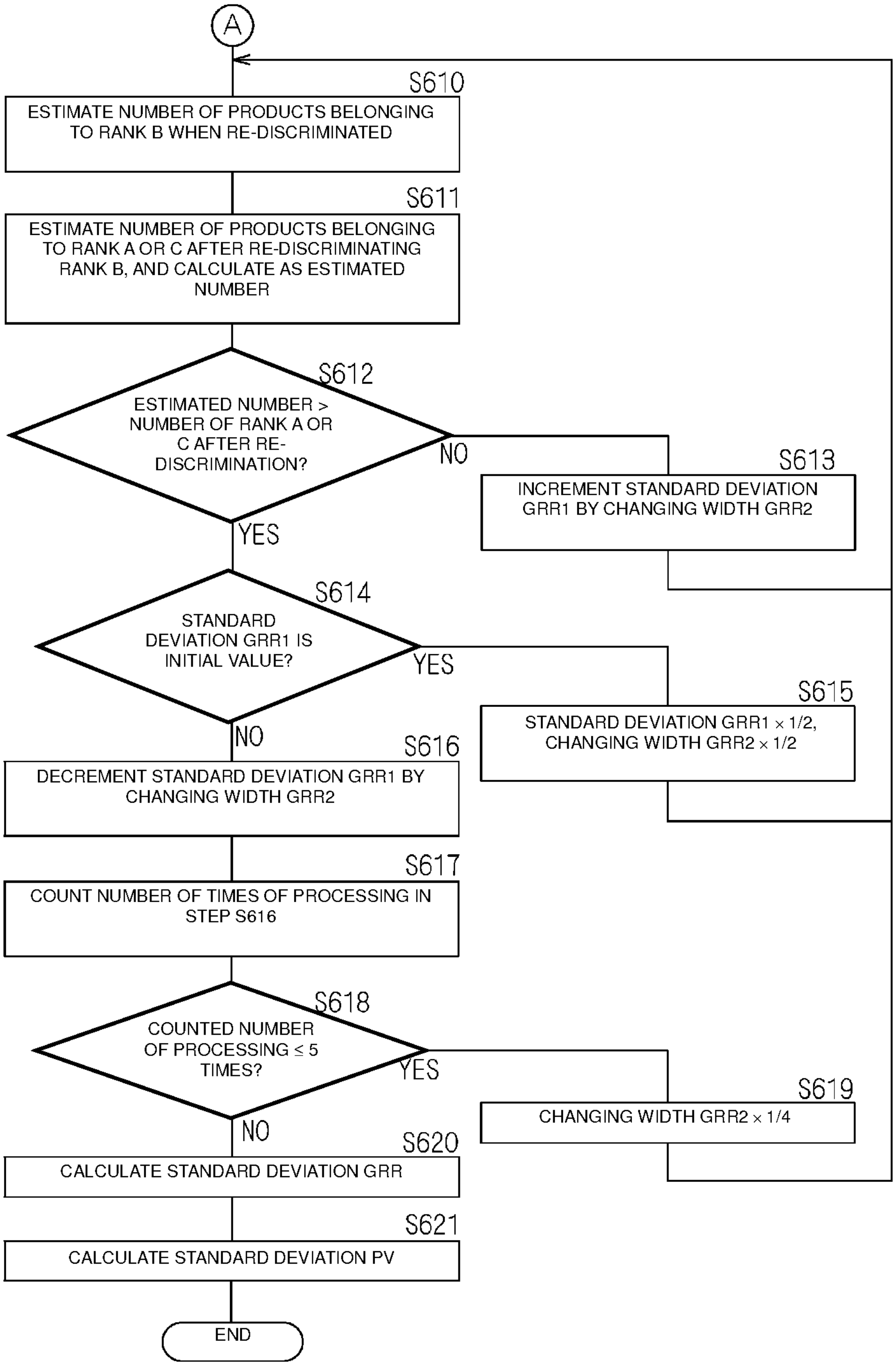
FIG. 6 is a flowchart showing a processing procedure in which the product discriminating device according to the first embodiment of the present invention calculates the standard deviation PV of the characteristic value variation and the standard deviation GRR of the measurement value variation.

Specifically, in the product discriminating device according to the first embodiment, the processing procedure for calculating the standard deviation PV of the characteristic value variation and the standard deviation GRR of the measurement value variation will be described with reference to flowcharts. FIG. 5 and FIG. 6 are flowcharts showing the processing procedure in which the product discriminating device according to the first embodiment of the present invention calculates the standard deviation PV of the characteristic value variation and the standard deviation GRR of the measurement value variation.

The CPU 21 of the calculation processing section 2 acquires the characteristic values of the products 10 measured in the measuring section 1 received through the measurement interface 27 (step S501), and discriminates the products 10 into the rank A, the rank B, and the rank C shown in FIG. 3 based on the acquired characteristic values of the products 10 (step S502). The CPU 21 transmits an instruction signal to the measuring section 1 to re-measure the characteristic values of the products 10 discriminated into the rank B (step S503). The measuring section 1 that received the instruction signal re-measures the characteristic values of the products 10 discriminated into the rank B. The CPU 21 again acquires the re-measured characteristic values of the products 10 (step S504), re-discriminates the products 10 into a plurality of ranks based on the again acquired characteristic values (step S505), and counts the number of re-discriminated products 10 belonging to each of the ranks (step S506).

The CPU 21 specifies the probability distribution of the characteristic values of the products 10 measured in the measuring section 1 based on the number of the products 10 belonging to at least one of the ranks of the rank A, the rank B, and the rank C as discriminated, and calculates the deemed standard deviation TV and the average value of the characteristic values (step S507).

The CPU 21 sets the standard deviation GRR of the measurement value variation to GRR1=0.1TV (initial value), and sets a changing width GRR2 of the standard deviation GRR of the measurement value variation to GRR2=(TV−GRR1)/10=(TV−0.1TV)/10=0.09TV (step S508).

The CPU 21 sets the standard deviation PV of the characteristic value variation based on the calculated deemed standard deviation TV and the set standard deviation GRR1 of the measurement value variation (step S509), and estimates the number of the products 10 belonging to the rank B when re-discriminated, from the probability distribution of the set standard deviation PV of the characteristic value variation (step S610).

Figure 7:
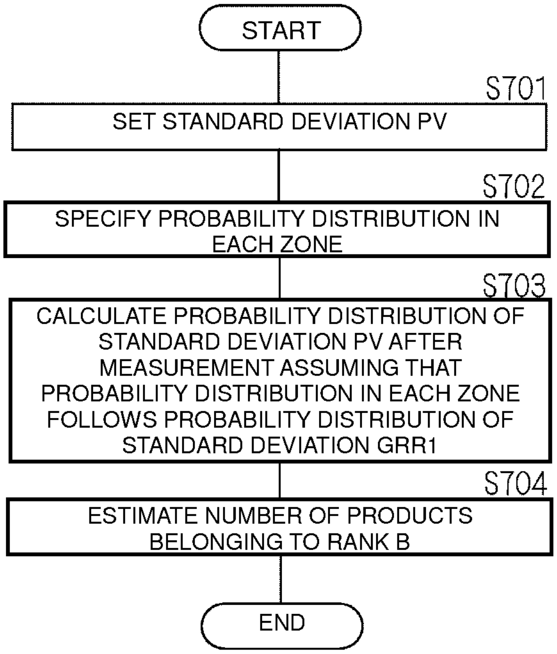
FIG. 7 is a flowchart showing a processing procedure in which the product discriminating device according to the first embodiment of the present invention estimates the number of the products discriminated into each rank.

The processing procedure in step S610 will be described with reference to a more detailed flowchart. FIG. 7 is a flowchart showing the processing procedure in which the product discriminating device according to the first embodiment of the present invention estimates the number of the products 10 when re-discriminated to each of the ranks. The CPU 21 substitutes the calculated deemed standard deviation TV and the set standard deviation GRR1 of the measurement value variation to (equation 1), and sets the standard deviation PV of the characteristic value variation (step S701). Specifically, the standard deviation PV of the characteristic value variation is obtained as $PV^2=TV^2-GRR^2$ from (equation 1), and can be calculated as $PV^2=TV^2-(0.1TV)^2$ by substituting GRR1=0.1TV of the initial set value.

Figure 8:
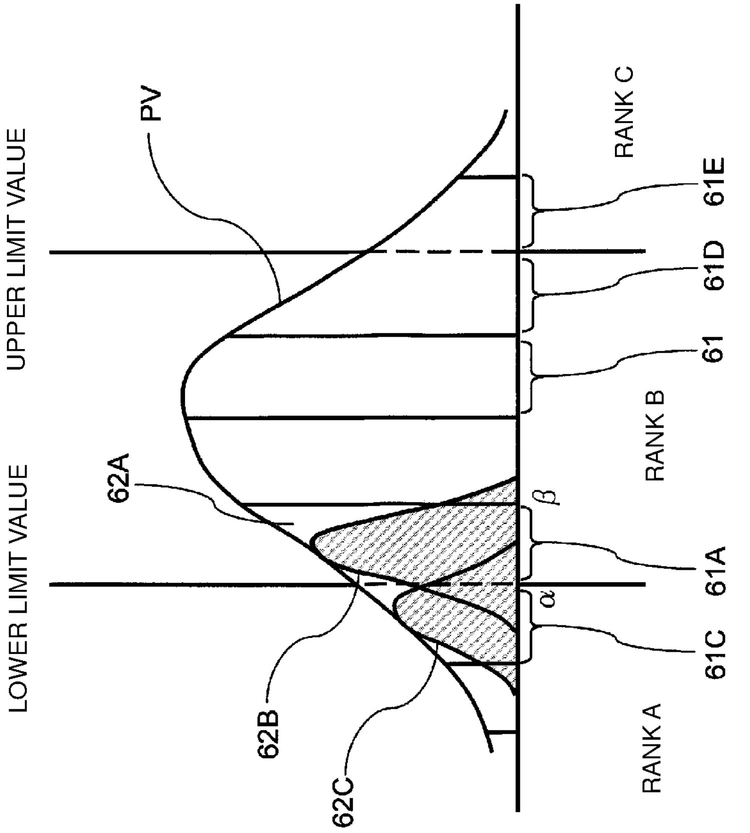
FIG. 8 is a schematic view showing a state in which a probability distribution in each zone of the standard deviation PV of the characteristic value variation follows a probability distribution of a standard deviation GRR1 of the measurement value variation.

The CPU 21 divides the probability distribution of the set standard deviation PV of the characteristic value variation into a plurality of zones for respective predetermined characteristic values, and specifies the probability distribution in each of the zones (step S702). The CPU 21 calculates the probability distribution of the standard deviation PV of the characteristic value variation as a result (hereinafter referred to as after measurement) of measuring with the assumption that the specified probability distribution in each zone follows the probability distribution of the standard deviation GRR1 of the measurement value variation (step S703). The assumption that the probability distribution in each zone follows the probability distribution of the standard deviation GRR1 of the measurement value variation will be described with reference to a drawing. FIG. 8 is a schematic view showing a state in which the probability distribution in each zone of the standard deviation PV of the characteristic value variation follows the probability distribution of the standard deviation GRR1 of the measurement value variation. As shown in FIG. 8, the probability distribution of the standard deviation PV of the characteristic value variation is divided into a plurality of zones 61 (nine zones in FIG. 8). For instance, the products 10 having the characteristic values from a characteristic value α to a characteristic value β exist in a zone 61A from the characteristic value α to the characteristic value β, but there is no product 10 having a characteristic value smaller than the characteristic value α or a characteristic value greater than the characteristic value β. Assuming that a probability distribution 62A after measurement of the zone 61 follows the probability distribution of the standard deviation GRR1 of the measurement value variation, the respective characteristic values of the products 10 belonging to the zone 61A have measurement value variation, and the probability distribution 62A in the zone 61A can be presumed as a probability distribution 62B after measurement. In the probability distribution 62B after measurement, there is also a product 10 having a characteristic value smaller than the characteristic value α or a characteristic value greater than the characteristic value β. The CPU 21 calculates the probability distribution of the standard deviation PV of the characteristic value variation after measurement by presuming the probability distribution in each zone 61 as the probability distribution after measurement.

The CPU 21 estimates the number of the products 10 belonging to the rank B based on the probability distribution of the standard deviation PV of the characteristic value variation after measurement (step S704). As shown in FIG. 8, there is a product 10 belonging to the rank A after measurement even when belonging to the zone 61A, because the probability distribution 62A in the zone 61A belonging to the rank B is presumed as the probability distribution 62B after measurement. There is also a product 10 belonging to the rank B even when belonging to the zone 61C, because the probability distribution in the zone 61C belonging to the rank A is presumed as the probability distribution 62C after measurement. The CPU 21 carries out, in each zone 61, the process of subtracting the products 10 not belonging to the rank B from the probability distribution 62B after measurement and adding the products 10 belonging to the rank B from the probability distribution 62C after measurement, assuming that the probability distribution 62A in the zone 61A is the probability distribution 62B after measurement and the probability distribution in the zone 61C is the probability distribution 62C after measurement, so as to estimate the number of the products 10 belonging to the rank B. In the actually used program, the calculation is carried out with the ranks A, B, and C being respectively divided into about 200 zones in order to enhance the accuracy.

Returning to FIG. 6, the CPU 21 in the calculation processing section 2 divides the ranks A, B, and C respectively into 200 zones, further divides the probability distribution in the rank B in which the number is estimated into a plurality of zones for every probability distribution discriminated into the rank B after measuring the characteristic values of the products 10 belonging to each zone, estimates the number of the products 10 belonging to the rank A or C after re-discriminating the rank B assuming that the probability distribution in each zone follows the probability distribution of the standard deviation GRR1 of the measurement value variation, and calculates the same as the estimated number of the rank A or C (step S611). Assuming that the probability distribution in each zone of the rank B in which the number is estimated follows the probability distribution of the standard deviation GRR1 of the measurement value variation, and estimating the number of the products 10 belonging to the rank A or C from the probability distribution after measurement of the rank B are the same as the processing procedure shown in FIG. 7 in which step S610 is described in detail, and hence the detailed description thereof will not be repeated.

The CPU 21 determines whether or not the estimated number of the products 10 belonging to the rank A or C is greater than the number of the products 10 belonging to the rank A or C re-discriminated in step S505 (step S612). If the CPU 21 determines that the estimated number is smaller than or equal to the number of the products 10 belonging to the rank A or C re-discriminated in step S505 (step S612: NO), the CPU 21 increments the standard deviation GRR1 of the measurement value variation by the changing width GRR2 (step S613), and returns the process to step S610. Specifically, in step S613, the standard deviation GRR1 of the measurement value variation is incremented by the changing width GRR2 (0.09TV) such as 0.1TV+0.09TV, 0.1TV+0.09TV+0.09TV, . . . until the estimated number becomes greater than the number of the products 10 belonging to the rank A or C re-discriminated in step S505.

If the CPU 21 determines that the estimated number is greater than the number of the products 10 belonging to the rank A or C re-discriminated in step S505 (step S612: YES), the CPU 21 determines whether or not the standard deviation GRR1 of the measurement value variation is the initial value (0.1TV) (step S614).

If the CPU 21 determines that the standard deviation GRR1 of the measurement value variation is the initial value (0.1TV) (step S614: YES), the standard deviation GRR of the measurement value variation becomes smaller than GRR1, and hence the CPU 21 sets the standard deviation GRR1 of the measurement value variation to one half (GRR1=0.05TV), sets the changing width GRR2 to one half (0.045TV) (step S615), and returns the process to step S610.

If the CPU 21 determines that the standard deviation GRR1 of the measurement value variation is not the initial value (0.1TV) (step S614: NO), the CPU 21 decrements the standard deviation GRR1 of the measurement value variation by the changing width GRR2 in order to raise the accuracy of the standard deviation GRR1 of the measurement value variation (step S616).

The CPU 21 counts the number of times the process in step S616 is carried out (step S617), and determines whether or not the counted number of processing is five times or less (step S618). If the CPU 21 determines that the counted number of processing is five times or less (step S618: YES), the accuracy of the standard deviation GRR1 of the measurement value variation is determined as still insufficient, and the CPU 21 sets the changing width GRR2 to one fourth (step S619) and returns the process to step S610. If the CPU 21 determines that the counted number of processing is greater than five times (step S618: NO), the accuracy of the standard deviation GRR1 of the measurement value variation is determined as sufficient, and the CPU 21 calculates a value in which the standard deviation GRR1 of the measurement value variation after the process in step S616 is increased by one half of the changing width GRR2 as the standard deviation GRR of the measurement value variation (step S620), and calculates the standard deviation PV of the characteristic value variation by substituting the calculated standard deviation GRR of the measurement value variation and the calculated deemed standard deviation TV to (equation 1) (step S621).

By carrying out the processing procedure shown in FIG. 5 and FIG. 6, when the products 10 are capacitors each having a condenser capacity of 1 pF (the discriminating unit 3 discriminated 3525 products with the lower limit value of 0.985 pF and the upper limit value of 1.015 pF of the inspection standard to 543 products in the rank A, 1758 products in the rank B, and 1224 products in the rank C. The re-discriminating unit 5 discriminated the 1758 products 10 belonging to the rank B to 77 products in the rank A, 1559 products in the rank B, and 122 products in the rank C), the average value of the characteristic values is calculated as 1.0067 pF, the deemed standard deviation TV as 0.02125 pF, the standard deviation PV of the characteristic value variation as 0.02096 pF, and the standard deviation GRR of the measurement value variation as 0.00350 pF. In the first embodiment, the case of discriminating or re-discriminating the products 10 into the three ranks of the rank A, the rank B, and the rank C, has been described, but the zone 61A, the zone 61D, or the like belonging to the rank B as shown in FIG. 8 may be assumed as one rank (sub-rank), and the average value of the characteristic values, the deemed standard deviation TV, the standard deviation PV of the characteristic value variation, and the standard deviation GRR of the measurement value variation as described above can be similarly calculated from the number of the products 10 belonging to the range smaller than or equal to the upper limit value and greater than or equal to the lower limit value of the sub-rank after re-discrimination, the number of the products 10 belonging to the range smaller than the lower limit value of the sub-rank, and the number of the products 10 belonging to the range greater than the upper limit value of the sub-rank.

As shown in step S501 to step S506, the products 10 are not limitedly discriminated or re-discriminated based on the characteristic values of the products 10 measured in the measuring section 1 and received through the measurement interface 27, and the result of discriminating or re-discriminating the products 10 may be received by inputting etc. from the keyboard 241 without discriminating or re-discriminating the products 10.

As described above, in the product discriminating device according to the first embodiment, the variables of the probability distribution of the deemed standard deviation TV are changed such that the number of the products 10 belonging to the rank A or C in which the products 10 belonging to the rank B are re-discriminated in the re-discriminating unit 5 and the estimated number of the products 10 belonging to the rank A or C after re-discrimination based on the probability distribution of the deemed standard deviation TV having the standard deviation PV of the characteristic value variation and the standard deviation GRR of the measurement value variation as variables substantially match each other, and the changed variables are calculated as the standard deviation PV of the characteristic value variation and the standard deviation GRR of the measurement value variation, so that the standard deviation GRR of the measurement value variation can be calculated without performing the repeated measurement, which is required in the method of the measurement system analysis (MSA).

In the product discriminating device according to the first embodiment, the repeated measurement does not need to be carried out in order to calculate the standard deviation GRR of the measurement value variation as in the method of the measurement system analysis (MSA), and thus the time required for the repeated measurement is unnecessary and the standard deviation GRR of the measurement value variation can be calculated in a short period of time. In particular, in the product discriminating device according to the first embodiment incorporated in a inspection process of a manufacturing line, the troublesome task such as detaching the measurement jig took time and about two hours were required to calculate the standard deviation GRR of the measurement value variation if the method of the measurement system analysis (MSA) was used, but it can be calculated in about five minutes if the product discriminating method according to the first method is used.

Furthermore, in the product discriminating device according to the first embodiment, the accuracy is significantly better since the standard deviation PV of the characteristic value variation and the standard deviation GRR of the measurement value variation are calculated by measuring a great number of the products 10 compared to the method of the measurement system analysis (MSA). For instance, about ten products 10 are measured in the method of the measurement system analysis (MSA), whereas ten thousand products 10 are measured in the product discriminating device according to the first embodiment, so that the accuracy of the standard deviation PV of the characteristic value variation and the standard deviation GRR of the measurement value variation to be calculated improves by about three times compared to those calculated with the method of the measurement system analysis (MSA).

In the product discriminating device according to the first embodiment, the probability of mistakenly discriminating and shipping a defective article as a non-defective article can be reduced since the characteristic values of the products 10 belonging to the rank B discriminated as non-defective articles are re-measured and re-discriminated into a plurality of ranks based on the re-measured characteristic values.

The product discriminating device according to the first embodiment is not limited to a case where the rank estimated number calculation unit 6 divides the probability distribution of the standard deviation PV of the characteristic value variation into a plurality of zones, and estimates the number of the products 10 belonging to each rank and calculates as the estimated number of the products 10 belonging to each rank, assuming that the probability distribution in each zone follows the probability distribution of the standard deviation GRR of the measurement value variation, and the characteristic values of the products 10 based on the probability distribution of the deemed standard deviation TV having the standard deviation PV of the characteristic value variation and the standard deviation GRR of the measurement value variation as variables may be generated through the Monte Carlo method, and the number of the products 10 belonging to each rank may be estimated to calculate the estimated number.

(Second Embodiment)

In the product discriminating device according to the first embodiment of the present invention, there was described a case of re-measuring the characteristic values of the products 10 belonging to the rank B, re-discriminating the same into a plurality of ranks based on the re-measured characteristic values, and calculating the standard deviation PV of the characteristic value variation and the standard deviation GRR of the measurement value variation. In a product discriminating device according to a second embodiment of the present invention, described is a case of re-measuring the characteristic values of the products 10 belonging to the rank A or C, re-discriminating the same into a plurality of ranks based on the re-measured characteristic values, and calculating the standard deviation PV of the characteristic value variation and the standard deviation GRR of the measurement value variation. Thus, a block diagram and a functional block diagram showing a configuration example of the product discriminating device according to the second embodiment are the same as FIG. 1 and FIG. 2 of the first embodiment, and the detailed description will not be repeated, and description will be made with the same reference symbols denoted on the configuring elements.

The discriminating unit 3 shown in FIG. 2 discriminates the products 10 into the plurality of ranks A, B, and C as shown in FIG. 3 based on the characteristic values measured in the measuring section 1. The re-discriminating unit 5 re-measures in the measuring section 1 the characteristic values of the products 10 belonging to the rank A or C discriminated by the discriminating unit 3, and re-discriminates the products 10 into ranks provided with the inspection standard same as the discriminating unit 3 as a reference based on the re-measured characteristic values.

Figure 9:
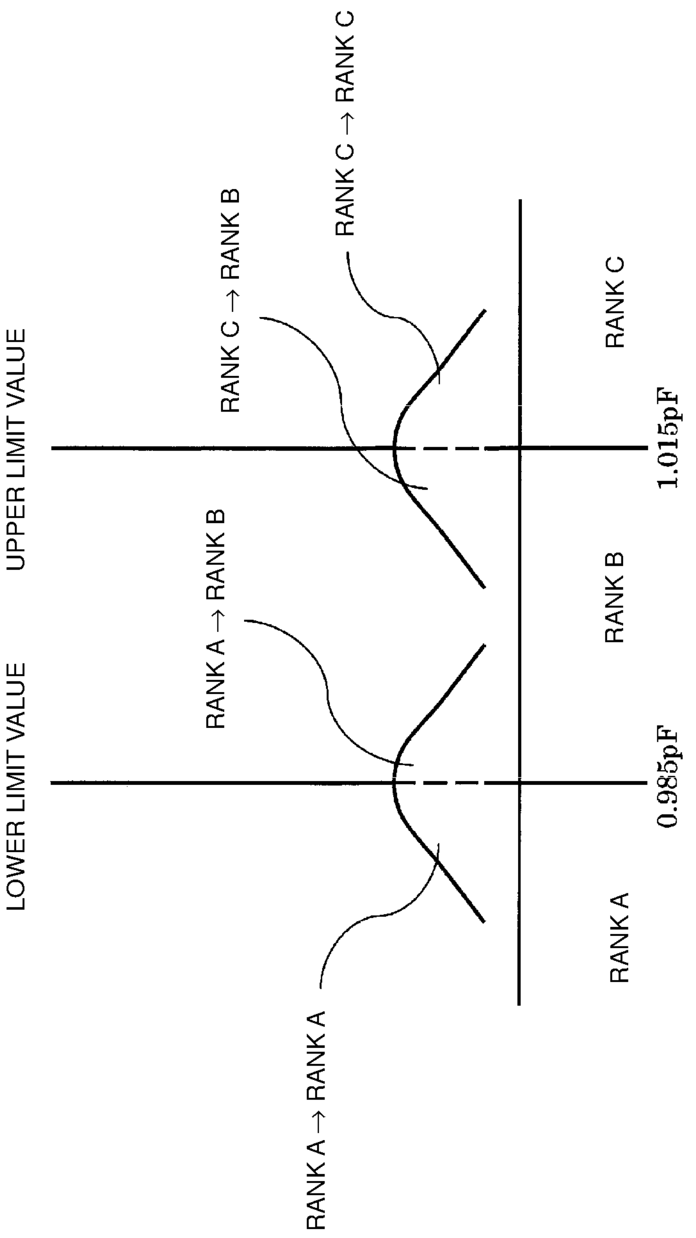
FIG. 9 is a schematic view of a probability distribution in a case where a re-discriminating unit of a product discriminating device according to a second embodiment of the present invention re-discriminates products belonging to a rank A or C into a plurality of ranks.

A specific example in which the re-discriminating unit 5 re-discriminates the products 10 belonging to the rank A or C into a plurality of ranks will be described with reference to a drawing. FIG. 9 is a schematic view of a probability distribution in a case where the re-discriminating unit 5 of the product discriminating device according to the second embodiment of the present invention re-discriminates the products 10 belonging to the rank A or C into a plurality of ranks. Similarly to FIG. 3, FIG. 9 also shows the upper limit value and the lower limit value of the characteristic values defined by the inspection standard. FIG. 9 shows a state in which the products 10 belonging to the rank A or C in the discrimination are re-discriminated into the rank B by the measurement value variation of the measuring section 1. Specifically, the products 10 belonging to the rank A in FIG. 9 are re-discriminated from the rank A to the rank A. The products 10 belonging to the rank C in FIG. 9 are re-discriminated from the rank C to the rank C. The products 10 belonging to the rank B in FIG. 9 are re-discriminated from the rank A or C to the rank B.

For instance, when the re-discriminated products 10 are capacitors each having a condenser capacity of 1 pF, and 3525 products 10 are measured in the measuring section 1, the discriminating unit 3 having the lower limit value of the inspection standard as 0.985 pF and the upper limit value as 1.015 pF discriminates the 3525 products 10 to 543 products in the rank A, 1758 products in the rank B, and 1224 products in the rank C. The re-discriminating unit 5 re-measures in the measuring section 1 the characteristic values of the 1767 (543+1224) products 10 belonging to the rank A or C and re-discriminates the products into a plurality of ranks based on the re-measured characteristic values. As a result of the re-discrimination in the re-discriminating unit 5, the products 10 are re-discriminated to 465 products in the rank A, 199 products in the rank B, and 1103 products in the rank C. In this case, the conditions of the re-discriminated 1568 (465+1103) products 10 belonging to the rank A or C are the following two types of conditions, third and fourth conditions. The third condition is that the product 10 is truly in the rank B (the true characteristic value is within a range smaller than or equal to the upper limit value and greater than or equal to the lower limit value of the inspection standard), the product 10 being discriminated into the rank A or C in the discriminating unit 3 and re-discriminated into the rank A or C in the re-discriminating unit 5. The fourth condition is that the product 10 is truly in the rank A or C (the true characteristic value is within a range greater than the upper limit value and smaller than the lower limit value of the inspection standard), the product 10 being discriminated into the rank A or C in the discriminating unit 3 and re-discriminated into the rank A or C in the re-discriminating unit 5.

Also in the product discriminating device according to the second embodiment, the standard deviation PV of the characteristic value variation and the standard deviation GRR of the measurement value variation of the products 10 that satisfy both (equation 1) and the number of the products 10 satisfying the third condition and the fourth condition are to be calculated using the rank estimated number calculation unit 6 and the standard deviation calculation unit 7 shown in FIG. 2. The rank estimated number calculation unit 6 estimates the number of the products 10 belonging to each of the ranks A, B, and C after the re-discrimination based on the probability distribution of the deemed standard deviation TV having the standard deviation PV of the characteristic value variation and the standard deviation GRR of the measurement value variation as variables, and calculates the same as the estimated number of the products 10 belonging to each of the ranks. The standard deviation calculation unit 7 changes the variables of the probability distribution of the deemed standard deviation TV such that the number of the products 10 belonging to the rank A or C re-discriminated in the re-discriminating unit 5 and the estimated number of the products 10 belonging to the rank A or C substantially match each other, and calculates the changed variables as the standard deviation PV of the characteristic value variation and the standard deviation GRR of the measurement value variation of the products 10.

Figure 10:
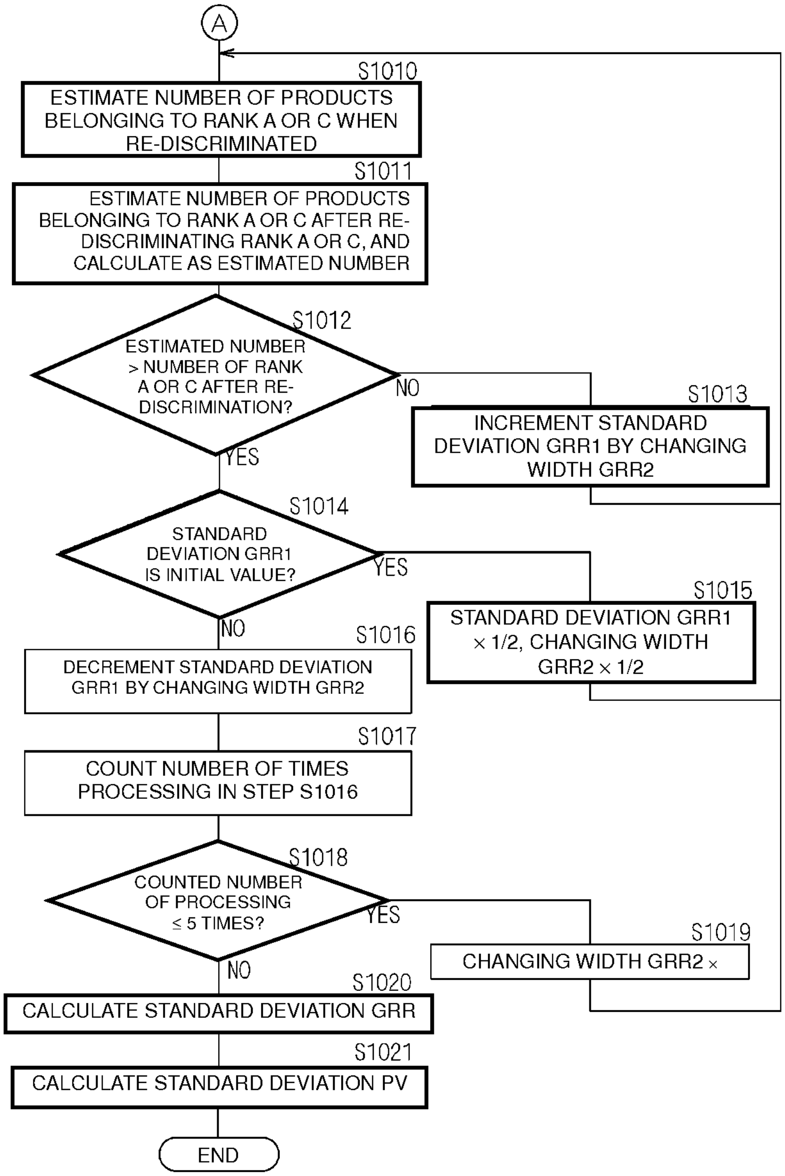
FIG. 10 is a flowchart showing a processing procedure in which the product discriminating device according to the second embodiment of the present invention calculates a standard deviation PV of characteristic value variation and a standard deviation GRR of measurement value variation.

Specifically, the processes carried out in the rank estimated number calculation unit 6 and the standard deviation calculation unit 7 in the second embodiment are similar to those of the first embodiment, and the standard deviation PV of the characteristic value variation and the standard deviation GRR of the measurement value variation are calculated. FIG. 10 is a flowchart showing the processing procedure in which the product discriminating device according to the second embodiment of the present invention calculates the standard deviation PV of the characteristic value variation and the standard deviation GRR of the measurement value variation. The processing procedure in which the product discriminating device according to the second embodiment calculates the standard deviation PV of the characteristic value variation and the standard deviation GRR of the measurement value variation is the same as the processing procedure from step S501 to step S509 in the first embodiment shown in FIG. 5. The flowchart shown in FIG. 10 is the same as the flowchart of the first embodiment shown in FIG. 6 other than step S1010 and step S1011, and thus the detailed description thereof will not be repeated.

In place of step S610, the CPU 21 estimates the number of the products 10 belonging to the rank A or C when re-discriminated from the probability distribution of the set standard deviation PV of the characteristic value variation (step S1010). Furthermore, in place of step S611, the CPU 21 further divides the probability distribution of the rank A or C in which the number is estimated into a plurality of zones, estimates the number of the products 10 belonging to the rank A or C after re-discriminating the rank A or C assuming that the probability distribution in each zone follows the probability distribution of the standard deviation GRR1 of the measurement value variation, and calculates the same as the estimated number of the rank A or C (step S1011). Thereafter, steps S1012 through S1021 are carried out in the same manner as steps S612 through S621 described with reference to FIG. 6.

As described above, in the product discriminating device according to the second embodiment, the variables of the probability distribution of the deemed standard deviation TV are changed such that the number of the products 10 belonging to the rank A or C in which the products 10 belonging to rank A or C are re-discriminated in the re-discriminating unit 5 and the estimated number of the products 10 belonging to the rank A or C after the re-discrimination based on the probability distribution of the deemed standard deviation TV having the standard deviation PV of the characteristic value variation and the standard deviation GRR of the measurement value variation as variables substantially match each other, and the changed variables are calculated as the standard deviation PV of the characteristic value variation and the standard deviation GRR of the measurement value variation, so that the standard deviation GRR of the measurement value variation can be calculated without performing the repeated measurement, which is required in the method of the measurement system analysis (MSA).

In the product discriminating device according to the second embodiment, the probability of mistakenly discriminating a non-defective article as a defective article can be reduced and the rate of the non-defective articles can be improved since the characteristic values of the products 10 belonging to the rank A or C and discriminated as defective articles are re-measured and re-discriminated into a plurality of ranks based on the re-measured characteristic values.

In the second embodiment, described is the case of discriminating or re-discriminating the products 10 into the three ranks of the rank A, the rank B, and the rank C, but the zone 61C belonging to the rank A, the zone 61E belonging to the rank C, or the like shown in FIG. 8 may be assumed as one rank (sub-rank), and the average value of the characteristic values, the deemed standard deviation TV, the standard deviation PV of the characteristic value variation, and the standard deviation GRR of the measurement value variation described above can be similarly calculated from the number of the products 10 belonging to the range smaller than or equal to the upper limit value and greater than or equal to the lower limit value of the sub-rank after the re-discrimination, the number of the products 10 belonging to the range smaller than the lower limit value of the sub-rank, and the number of the products 10 belonging to the range greater than the upper limit value of the sub-rank.

The product discriminating device according to the second embodiment is also not limited to the case where the rank estimated number calculation unit 6 divides the probability distribution of the standard deviation PV of the characteristic value variation into a plurality of zones, and estimates the number of the products 10 belonging to each rank and calculates the same as the estimated number of the products 10 belonging to each rank, assuming that the probability distribution in each zone follows the standard deviation GRR of the measurement value variation, and the characteristic values of the products 10 based on the probability distribution of the deemed standard deviation TV having the standard deviation PV of the characteristic value variation and the standard deviation GRR of the measurement value variation as variables may be generated through the Monte Carlo method, and the number of the products 10 belonging to each rank may be estimated to calculate the estimated number.

DESCRIPTION OF THE REFERENCE SYMBOLS

1 measuring section
2 calculation processing section
3 discriminating unit
4 deemed standard deviation calculation unit
5 re-discriminating unit
6 rank estimated number calculation unit
7 standard deviation calculation unit
10 product
21 CPU
22 memory
23 storage device
24 I/O interface
25 video interface
26 portable disc drive
27 measurement interface
28 internal bus
90 portable recording medium
230 computer program
241 keyboard
242 mouse
251 display device

The invention claimed is:

1. A product discriminating device comprising:

a measuring section configured to measure characteristic values indicating predetermined characteristics of products;

a discriminating unit configured to discriminate the products into a predetermined plurality of ranks based on the measured characteristic values;

a deemed standard deviation calculation unit that calculates a deemed standard deviation, which includes: (i) a standard deviation of measurement value variation indicating variation in measurement results of the measuring section, and (ii) a standard deviation of the variation in the characteristic values of the products;

a re-discriminating unit configured to re-measure the characteristic values of the products belonging to at least one of the predetermined plurality of ranks and re-discriminate the products into the predetermined plurality of ranks based on the re-measured characteristic values;

a rank estimated number calculation unit that estimates the number of the products belonging to each of the predetermined plurality of ranks after the products have been re-discriminated at least once based on a probability distribution of the deemed standard deviation, and calculates an estimated number of the products belonging to each of the predetermined plurality of ranks; and a standard deviation calculation unit that changes the variables of the deemed standard deviation, and, therefore, the probability distribution, as a function of the similarity between the products belonging to at least one of the plurality of ranks after the products have been re-discriminated at least once and the estimated number of the products belonging to the predetermined plurality of ranks match each other.

2. The product discriminating device according to claim 1, wherein the predetermined plurality of ranks are provided, as a reference, with a predetermined inspection standard which defines an upper limit value and a lower limit value of the characteristic values for determining whether or not each of the products is a non-defective article;

the re-discriminating unit re-discriminates the products belonging to a rank in which the characteristic values are smaller than or equal to the upper limit value and greater than or equal to the lower limit value of the predetermined inspection standard; and the standard deviation calculation unit calculates the variables of the probability distribution, in which the number of the re-discriminated products belonging to a rank greater than the upper limit value of the predetermined inspection standard and a rank smaller than the lower limit value of the predetermined inspection standard, and the estimated number of the products belonging to the ranks match each other, as the standard deviation of the characteristic value variation of the products and the standard deviation of the measurement value variation.

3. The product discriminating device according to claim 1, wherein the predetermined plurality of ranks are provided, as a reference, with a predetermined inspection standard which defines an upper limit value and a lower limit value of the characteristic values for determining whether or not each of the products is a non-defective article;

the re-discriminating unit re-discriminates the products belonging to a rank in which the characteristic values are greater than the upper limit value of the predetermined inspection standard and a rank in which the characteristic values are smaller than the lower limit value of the predetermined inspection standard; and the standard deviation calculation unit calculates the variables of the probability distribution, in which the number of the re-discriminated products belonging to the rank greater than the upper limit value of the predetermined inspection standard and the rank smaller than the lower limit value of the predetermined inspection standard, and the estimated number of the products belonging to the ranks substantially match each other, as the standard deviation of the characteristic value variation of the products and the standard deviation of the measurement value variation.

4. The product discriminating device according to claim 1, wherein the rank estimated number calculation unit is configured to divide the probability distribution of the standard deviation of the characteristic value variation of the products into a plurality of zones, and estimate the number of the products belonging to each of the ranks assuming that the probability distribution in each of the zones follows the probability distribution of the standard deviation of the measurement value variation.

5. A product discriminating method comprising:

measuring characteristic values indicating predetermined characteristics of products;

discriminating the products into a predetermined plurality of ranks based on the measured characteristic values;

calculating a standard deviation of variation in the measured characteristic values as a deemed standard deviation, which includes: (i) a standard deviation of measurement value variation as variables, and (ii) a standard deviation of the variation in the characteristic values of the products;

re-measuring characteristic values of the products belonging to at least one of the discriminated predetermined plurality of ranks and re-discriminating the products into the predetermined plurality of ranks based on the re-measured characteristic values;

estimating the number of the products belonging to each of the ranks when re-discriminated at least once based on a probability distribution of the deemed standard deviation;

calculating an estimated number of the products belonging to each of the ranks; and changing the variables of the deemed standard deviation, and, therefore, the probability distribution, as a function of the similarity between the products belonging to at least one of the plurality of ranks after the products have been re-discriminated at least once and the estimated number of the products belonging to the rank match each other.

6. The product discriminating method according to claim 5, wherein the predetermined plurality of ranks are provided, as a reference, with a predetermined inspection standard which defines an upper limit value and a lower limit value of the characteristic values for determining whether or not each of the products is a non-defective article;

the products belonging to a rank in which the characteristic values are smaller than or equal to the upper limit value and greater than or equal to the lower limit value of the predetermined inspection standard are re-discriminated; and the variables of the probability distribution, in which the number of the re-discriminated products belonging to a rank greater than the upper limit value of the predetermined inspection standard and a rank smaller than the lower limit value of the predetermined inspection standard, and the estimated number of the products belonging to the ranks match each other, are calculated as the standard deviation of the characteristic value variation of the products and the standard deviation of the measurement value variation.

7. The product discriminating device according to claim 5, wherein the predetermined plurality of ranks are provided, as a reference, with a predetermined inspection standard which defines an upper limit value and a lower limit value of the characteristic values for determining whether or not each of the products is a non-defective article;

the products belonging to a rank in which the characteristic values are greater than the upper limit value of the predetermined inspection standard and a rank in which the characteristic values are smaller than the lower limit value of the predetermined inspection standard are re-discriminated; and the variables of the probability distribution, in which the number of the re-discriminated products belonging to the rank greater than the upper limit value of the predetermined inspection standard and the rank smaller than the lower limit value of the predetermined inspection standard, and the estimated number of the products belonging to the ranks substantially match each other, are calculated as the standard deviation of the characteristic value variation of the products and the standard deviation of the measurement value variation.

8. The product discriminating method according to claim 5, wherein the probability distribution of the standard deviation of the characteristic value variation of the products is divided into a plurality of zones, and the number of the products belonging to each of the ranks is estimated assuming that the probability distribution in each of the zones follows the probability distribution of the standard deviation of the measurement value variation.

9. A non-transitory computer-readable medium executable in a product discriminating device for discriminating products; the computer-readable medium causing the product discriminating device to:

measure characteristic values indicating predetermined characteristics of products;

discriminate the products into a predetermined plurality of ranks based on the measured characteristic values;

calculate a standard deviation of variation in the measured characteristic values as a deemed standard deviation, which includes: (i) a standard deviation of measurement value variation as variables, and (ii) a standard deviation of the variation in the characteristic values of the products;

re-measure characteristic values of the products belonging to at least one of the discriminated predetermined plurality of ranks and re-discriminate the products into the predetermined plurality of ranks based on the re-measured characteristic values;

estimate the number of the products belonging to each of the ranks when re-discriminated at least once based on a probability distribution of the deemed standard deviation;

calculate an estimated number of the products belonging to each of the ranks; and change the variables of the deemed standard deviation, and, therefore, the probability distribution, as a function of the similarity between the products belonging to at least one of the plurality of ranks after the products have been re-discriminated at least once and the estimated number of the products belonging to the rank match eatch other.

10. The non-transitory computer-readable medium according to claim 9, wherein the predetermined plurality of ranks are provided, as a reference, with a predetermined inspection standard which defines an upper limit value and a lower limit value of the characteristic values for determining whether or not each of the products is a non-defective article; and the computer-readable medium further causes the product discriminating device to:

re-discriminate the products belonging to a rank in which the characteristic values are smaller than or equal to the upper limit value and greater than or equal to the lower limit value of the predetermined inspection standard, and calculate the variables of the probability distribution, in which the number of the re-discriminated products belonging to a rank greater than the upper limit value of the predetermined inspection standard and a rank smaller than the lower limit value of the predetermined inspection standard, and the estimated number of the products belonging to the ranks match each other, as the standard deviation of the characteristic value variation of the products and the standard deviation of the measurement value variation.

11. The non-transitory computer-readable medium according to claim 9, wherein the predetermined plurality of ranks are provided, as a reference, with a predetermined inspection standard which defines an upper limit value and a lower limit value of the characteristic values for determining whether or not each of the products is a non-defective article; and the computer-readable medium further causes the product discriminating device to:

re-discriminate the products belonging to a rank in which the characteristic values are greater than the upper limit value of the predetermined inspection standard and a rank in which the characteristic values are smaller than the lower limit value of the predetermined inspection standard, and calculate the variables of the probability distribution, in which the number of the re-discriminated products belonging to the rank greater than the upper limit value of the predetermined inspection standard and the rank smaller than the lower limit value of the predetermined inspection standard, and the estimated number of the products belonging to the ranks substantially match each other, as the standard deviation of the characteristic value variation of the products and the standard deviation of the measurement value variation.

12. The non-transitory computer-readable medium according to claim 9, wherein the computer-readable medium further causes the product discriminating device to divide the probability distribution of the standard deviation of the characteristic value variation of the products into a plurality of zones, and estimate the number of the products belonging to each of the ranks assuming that the probability distribution in each of the zones follows the probability distribution of the standard deviation of the measurement value variation.

* * * * *